US005721293A

United States Patent [19]

Ichinose et al.

[11] Patent Number: 5,721,293
[45] Date of Patent: Feb. 24, 1998

[54] METHOD OF IMPARTING ORGANIC FUNCTIONAL GROUPS TO THE SURFACE OF FLUOROPOLYMERS BY IRRADIATION OF CARBOXYLIC ACIDS WITH ULTRAVIOLET LIGHT

[75] Inventors: Nobuyuki Ichinose; Shunichi Kawanishi, both of Osaka; Atsushi Okada, Shiga-ken; Shun'ichi Sugimoto, Osaka, all of Japan

[73] Assignees: Japan Atomic Energy Research Institute of Tokyo; Gunze Ltd. of Kyoto; Radiation Application Development Association of Ibaraki-ken, all of, Japan

[21] Appl. No.: 550,812

[22] Filed: Oct. 31, 1995

[51] Int. Cl.$^6$ .................................................. C08F 2/46
[52] U.S. Cl. .......................... 522/130; 427/508; 427/554; 427/595; 427/596
[58] Field of Search .............................. 522/130; 427/508, 427/554, 595, 596

[56] References Cited

U.S. PATENT DOCUMENTS

| | | | |
|---|---|---|---|
| 5,051,312 | 9/1991 | Allmer | 522/134 |
| 5,362,525 | 11/1994 | Nishii et al. | 427/554 |
| 5,419,968 | 5/1995 | Okada et al. | 428/421 |

FOREIGN PATENT DOCUMENTS

| | | |
|---|---|---|
| 5-306346 | 11/1993 | Japan . |
| 6-172560 | 6/1994 | Japan . |
| 6-240026 | 8/1994 | Japan . |
| 6-248097 | 9/1994 | Japan . |
| 7-118421 | 5/1995 | Japan . |
| 7-207049 | 8/1995 | Japan . |
| 8-27293 | 1/1996 | Japan . |

OTHER PUBLICATIONS

Abstract of JP 8-27293, Jan. 1996.
Atsushi Okada Nobuyuki Ichinose and Shunichi Kawanishi, "Surface Modification of Tetrafluorethylene-Perfluoroalkyl Vinyl Ether Copolymer by Excimer Laser Irradiation", Kobunshi Ronbunshu, Japanese Journal of Polymer Science and Technology, vol. 52, No. 1, pp. 66–68 (Jan. 1995), with English Abstract.

*Primary Examiner*—Mark Chapman
*Attorney, Agent, or Firm*—Banner & Witcoff, Ltd.

[57] ABSTRACT

A fluoropolymer film or powder is brought into contact with a carboxylic acid and their surface is irradiated with ultraviolet light so that alkyl and other organic radicals derived from the carboxylic acid are introduced into the irradiated part, thereby imparting chemical affinity such as oleophilicity to the film or powder surface.

4 Claims, 2 Drawing Sheets

METHOD OF IMPARTING ORGANIC FUNCTIONAL GROUPS TO THE SURFACE OF FLUOROPOLYMERS BY IRRADIATION OF CARBOXYLIC ACIDS WITH ULTRAVIOLET LIGHT

BACKGROUND OF THE INVENTION

This invention relates to fluorinated polymer (fluoropolymer) films or powders that have been provided with organic functional Groups by bringing them into contact with carboxylic acids and irradiating the latter with ultraviolet light. More particularly, the invention relates to a method by which fluoropolymers are subjected to a photochemical reaction with organic carboxylic acids or salts thereof so that organic radicals derived from the carboxylic acids are imparted to the surface of those high polymers, thereby allowing them to have chemical affinity such as oleophilicity.

Various methods have heretofore been known as techniques to improve the surfaces of fluoropolymer films and they include, for example, reduction with alkali metals, plasma treatment, replacement of F atoms with $CH_3$ or $NH_2$ groups by irradiation with an excimer laser in a $B(CH_3)_3$, $B_2H_6$ or $NH_3$ gas atmosphere, and irradiation with an excimer laser in water.

Fluoropolymers such as polytetrafluoroethylene (PTFE) are highly chemical-resistant since they have only low affinity for water and organic solvents but, on the other hand, they are not suitable for use in the manufacture of composite materials because of their low adhesiveness to other materials. In recent years, it has become a common practice to modify the surface of fluoropolymers by ultraviolet radiation emitted from light sources such as an excimer laser and this technique has primarily been applied for the purpose of rendering the polymer surface hydrophilic. For example, a report has been made that describes the effectiveness of irradiating a fluoropolymer with light from an excimer laser while the polymer is held in contact with water (Okada et al., Chemistry Letters, 1993, 1637). To render fluoropolymers oleophilic, the method using $B(CH_3)_3$ (see supra) is employed; however, due to the use of the flammable gas, not only the equipment but also the process operation are cumbersome and the overall cost is high. In addition, functional groups that can be introduced are limited since it is cumbersome to synthesize boron compounds $BR_3$ except in the case where the alkyl group R is a simple one such as methyl. It should particularly be mentioned that the chemically active nature of alkyl boron compounds makes it difficult to introduce substituted alkyl groups and the like. In contrast, the present invention is applicable to a wide range of organic carboxylic acids without any particular limitations and it is possible to introduce substituted alkyl groups and the like.

The columns in liquid chromatographs are in most cases packed with silica-gel based fine particles into which alkyl groups and other organic functionalities are introduced with the aid of silane coupling agents. However, such particles are subject to hydrolysis with acids or alkalies and can only be used in a pH range near neutrality. In addition, polar molecules that are adsorbed irreversibly on the surface of silica gel will not only shorten the life of the column but also interfere with analyses if the adsorbed polar molecules coexist with nonpolar molecules. To avoid these difficulties, a fluoropolymer powder that is provided with alkyl groups and other organic functionalities on the surface in accordance with the present invention may be used as a column packing material that is not only highly durable but which also permits analyses to be made over a wide range of use.

SUMMARY OF THE INVENTION

The present inventors used a carboxylic acid derivative and irradiated it with ultraviolet light, thereby successfully imparting organic functional groups to the surface of a fluoropolymer film or powder so that the latter would be rendered oleophilic to have better chemical characteristics.

Thus, according to the invention a film or powder of a fluoropolymer is brought into contact with a carboxylic acid and irradiated with ultraviolet light to photoexcite the carboxylic acid, thereby cleaving C—F bonds in the fluoropolymer so that the F atoms are replaced by alkyl and other organic functional groups derived from the carboxylic acid, thereby improving the chemical characteristics of the surface of the film or the powder.

DETAILED DESCRIPTION OF THE INVENTION

Figure 1:
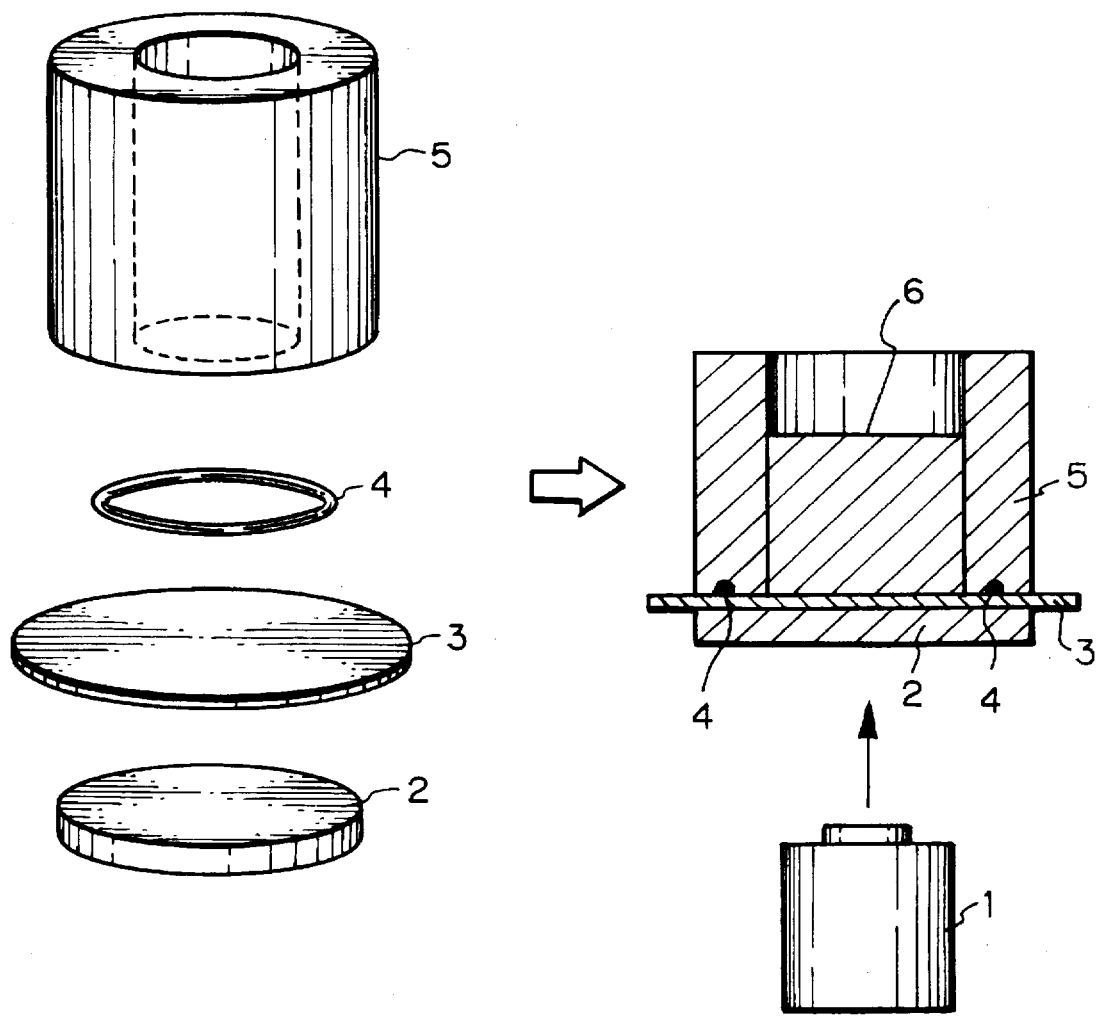
FIG. 1 shows an apparatus for imparting carboxylic acid-derived organic functional groups to the surface of a fluorinated high polymer by means of irradiation with ultraviolet light.

The ultraviolet light to be used in the invention has a sufficient photon energy to excite carboxylic acids and may be emitted from various light sources such as a mercury lamp and a laser.

The term "modification" as used herein means cleaving C—F bonds or C—C, C—O or C—Cl bonds in fluorinated high polymers and introducing organic radicals into the latter.

Upon irradiation with ultraviolet light, a fluoropolymer would be provided with chemical affinity on the surface by the following mechanism: the carboxylic acid absorbs the applied ultraviolet light to become excited and transfers one electron to the fluoropolymer directly or via ionization; it yields alkyl radicals via decarboxylation; the fluoropolymer becomes an anion radical which eliminates a fluoride ion to generate a polymer radical; the two radicals enter into a binding reaction, thereby imparting alkyl or functionalized alkyl groups to the surface of the fluoropolymer.

This is the mechanism or principle of the reaction involved in the present invention; when the carboxylic acid absorbs light, it undergoes photo-ionization to the fluoropolymer or, alternatively, one electron is transferred direct from the carboxylic acid to the fluoropolymer, thereby initiating the reaction. In short, the fluoropolymer radical generates simultaneously with the alkyl radical and the two radicals react with each other.

The reaction via ionization involves such a mechanism where electron is released from the carboxylic acid into and is trapped by the fluoropolymer. This is not the case when direct transfer of one electron occurs to generate a radical ion pair of the carboxylic acid and the fluoropolymer.

As of today, it has not been known which of the two mechanisms governs the progress of the reaction but it is at least held that the subsequent chemical reaction between radicals is common to both mechanisms and so is the energy balance before and after the reaction.

Therefore, the progress or non-progress of the reaction is determined only by the difference of potential (energy) between the carboxylic acid to be oxidized with one electron and the fluoropolymer to be reduced with one electron and the scope of applicability of the invention is only limited by this potential consideration. In other words, the reaction can in principle be caused to occur freely by combining the carboxylic acid which is to be decarboxylated through one-electron oxidation by the fluoropolymer from which a fluoride anion will be eliminated through one-electron reduction. The mechanisms of such reactions are represented below in terms of reaction schemes:

a) Mechanism of ionization

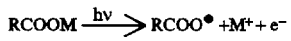

(carboxylic acid with M = H, Na, K, NH$_4$, etc.)

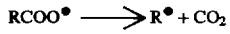

(alkyl radical)

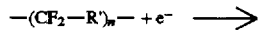

(fluorinated high polymer)

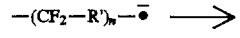

(high polymer radical anion)

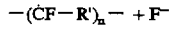

(high polymer radical)

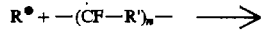

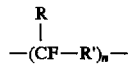

b) Mechanism of electron transfer

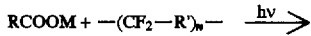

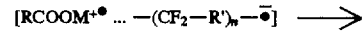

(radical ion pair)

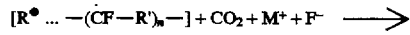

(radical pair)

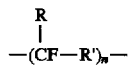

The method of bringing the fluoropolymer into contact with a carboxylic acid solution is not limited in any particular way.

The fluoropolymer that can be treated by the present invention may be exemplified by PFA (tetrafluoroethylene/perfluoroalkylvinyl ether copolymer), PTFE (polytetrafluoroethylene), FEP (tetrafluoroethylene/hexafluoropropylene copolymer) and PCTFE (polychlorotrifluoroethylene).

The carboxylic acid that can be used in the invention may be exemplified by saturated or unsaturated straight or branched alkylcarboxylic acids, aromatic carboxylic acids, as well as polycarboxylic acids and those carboxylic acids which have substituents such as halogens, hydroxyl and ester groups.

These carboxylic acids are polyfunctional alkyl carboxylic acids, such as caprylic acid, 1-naphthylacetic acid, gluconic acid, polyacrylic acid, 1,1-hydroxyundecanoic acid, 3-phenylpropionic acid; aromatic carboxylic acids, such as benzoic acid; and sodium or potassium salts thereof.

The thickness of the fluoropolymer film is not limited to any particular value and the only requirement is that it should allow the passage of ultraviolet light in a sufficient among to excite the carboxylic acid. It should, however, be noted that the film is preferably not thicker than 1 mm if patterns are to be formed by such means as a photomask.

The fluoropolymer film to be used in the invention includes within its scope: sheets, tubes, sleeves, etc. that are made of the fluoropolymer defined hereinabove. The invention is also applicable to shaped parts other than films and the scope of its applicability is practically unlimited.

The modified layer prepared by the invention is so thin that the bulk properties of the substrate are not impaired; in addition, it undergoes little discoloration. Hence, only the surface of this layer has outstanding properties and it could be used in various applications that take advantage of the properties of rugged polymers. As one example, thrombolytic artificial vessels can be prepared by introducing radicals that render the polymer surface less sensitive to the adsorption of proteins. Conversely, the polymer surface may be rendered adhesive to cells so as to prepare an artificial pancreas that has islets of Langerhans cultivated and fixed on the surfaces.

The following examples are provided for the purpose of further illustrating the present invention but are in no way to be taken as limiting the invention.

EXAMPLE 1

As shown in FIG. 1, a synthetic quartz substrate 2 was overlaid with a PFA film 3 (50 μm thick) and fixed to a Pyrex cell 5 with the aid of an O-ring 4. The cell was filled with an aqueous solution of sodium octanoate (0.1M) and irradiated with the normal incidence of the light (248 nm) of a KrF laser 4 through the substrate. The irradiation energy was 35 mJ/cm$^2$ and the repetition rate was 40 Hz, with 10,000 pulse shots being applied. After the irradiation, the film was washed with water and acetone.

The contact angle between the irradiated film and hexadecane was almost zero degrees, indicating the high oleophilicity of the film. Surface analysis by XPS showed the decrease in the height of the peak due to CF$_2$ in the Cls region and the increase in the height of the peak due to CH$_2$.

The same experiment was conducted, except that irradiation with laser light was performed using sodium 11-bromoundecanoate. XPS analysis showed the presence of bromine atoms on the film surface.

EXAMPLE 2

A synthetic quartz substrate 2 was overlaid with an FEP film 3 and fixed to a Pyrex cell 5 with the aid of an O-ring 4 (see FIG. 1). The cell was filled with an aqueous solution of sodium 1-naphthylacetate 6 (0.05M) and irradiated with ultraviolet light (254 nm) from a low-pressure mercury lamp 1 through the substrate for 2 h. The film was then washed with water and acetone and dried. A measurement of uv and visible absorption spectra gave a spectrum due to the absorption of a naphthalene ring.

Figure 2:
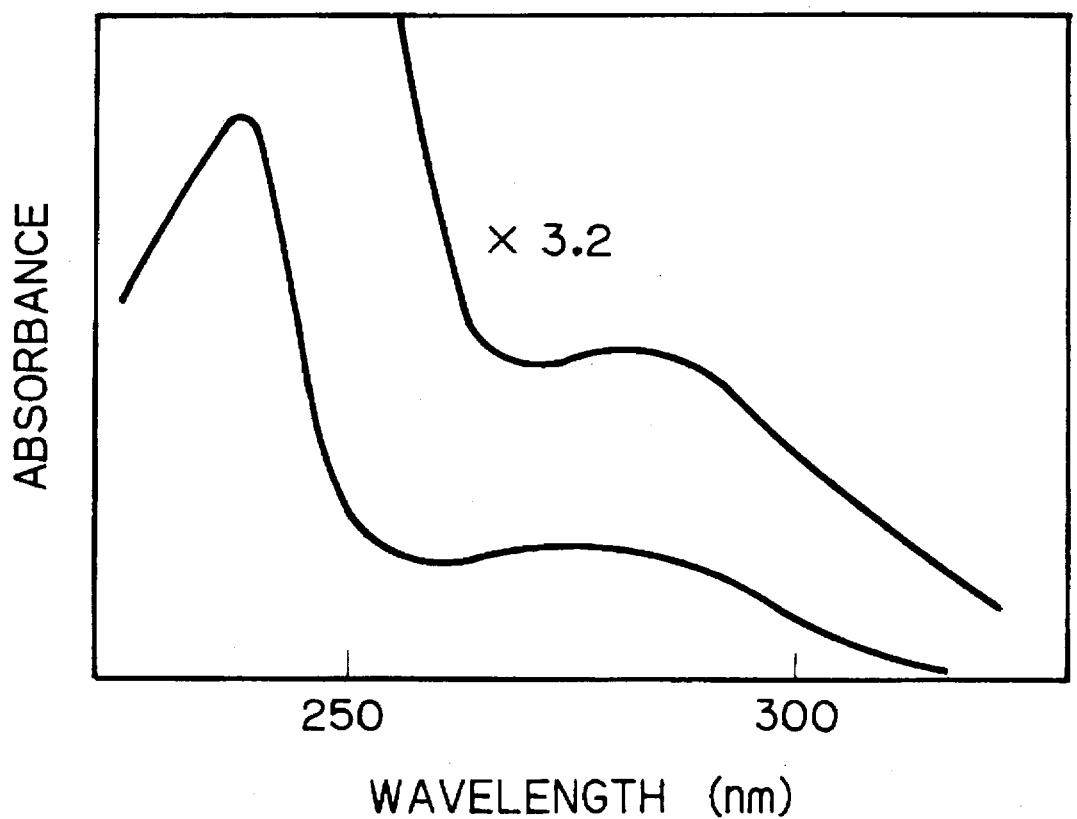
FIG. 2 is a graph showing the absorption spectrum of an FEP film that underwent a photoreaction with sodium 1-naphthylacetate in Example 2.

FIG. 2 is a graph obtained by subtracting the uv and visible absorption spectra of the yet to be reacted FEP film from those of the film that underwent the photoreaction. The graph shows a strong absorption at about 220 nm and a weak absorption at about 280 nm, indicating that 1-naphthylmethyl groups having naphthalene rings were introduced into the film. FEP from the absorption spectra shown in FIG. 2, one can see by calculation that such 1-naphthylmethyl groups were introduced in an amount of $4\times10^{-9}$ moles per square centimeter; considering the size of these naphthylmethyl groups, one can also see that the reaction had progressed by a certain extent into the film. FIG. 2 is also a direct proof of the fact that not only unsubstituted alkyl groups but also substituted alkyl groups such as 1-naphthylmethyl group having a naphthalene group can be introduced photochemically.

According to the invention, organic radicals such as unsubstituted or substituted alkyl groups can conveniently be imparted to the surfaces of many fluoropolymers so as to improve their chemical affinity, as well as their chemical characteristics such as adhesiveness, thereby expanding the scope of applicability of the fluoropolymeric materials. By use of substituted carboxylic acids, functional groups such as ester groups can be easily introduced, thereby enabling many functional molecules to be fixed on the surfaces of high polymers. Thus, the potential applicability of the invention also covers molecular devices and biomaterials.

The practical feasibility of the invention is the greatest when organic radicals such as alkyl groups are imparted to the surface of a fluorinated high polymer powder because the so treated powder finds use as a mobile phase (column packing material) in high-performance liquid chromatography. Therefore, by applying the invention, one can prepare packing materials for use with many columns including optically active columns which are used to isolate optical isomers having optically active molecules fixed thereto, as well as columns for separating bio-related substances of low adsorptivity.

What is claimed is:

1. A method for imparting chemical affinity to a film of fluoropolymers by exposing the surface of the film to ultraviolet light in contact with carboxylic acids or salts thereof and thereby introducing an alkyl or other organic radicals derived from said carboxylic acids or salts into the exposed part of the film, wherein said carboxylic acids are selected from the group consisting of 1-naphthylacetic acid, gluconic acid, polyacrylic acid, 1,1-hydroxyundecanoic acid, 3-phenylpropionic acid, and benzoic acid and wherein the chemical affinity of oleophilicity is imparted to the film of fluoropolymers.

2. A method according to claim 1, wherein the carboxylic acids or salts are in the form of an aqueous solution containing the carboxylic acids or salts thereof.

3. A method for imparting chemical affinity to a powder of fluoropolymers by exposing the surface of the powder to ultraviolet light in contact with a carboxylic acids or salts thereof and thereby introducing an alkyl or other organic radicals derived from said carboxylic acids or salts into the exposed part of the powder, wherein said carboxylic acids are selected from the group consisting of 1-naphthylacetic acid, gluconic acid, polyacrylic acid, 1,1-hydroxyundecanoic acid, 3-phenylpropionic acid, and benzoic acid and wherein the chemical affinity of oleophilicity is imparted to the powder of fluoropolymers.

4. A method according to claim 3, wherein the carboxylic acids or salts are in the form of an aqueous solution containing the carboxylic acids or salts thereof.

\* \* \* \* \*